United States Patent [19]
Chen et al.

[11] Patent Number: 5,635,558
[45] Date of Patent: Jun. 3, 1997

[54] POLYAMIDE-POLYARLENE SULFIDE BLENDS

[75] Inventors: Yu-Tsai Chen, Glen Ellyn; David P. Sinclair, Winfield, both of Ill.

[73] Assignee: Amoco Corporation, Chicago, Ill.

[21] Appl. No.: 478,718

[22] Filed: Jun. 7, 1995

Related U.S. Application Data

[63] Continuation-in-part of Ser. No. 784,763, Oct. 30, 1991, abandoned, which is a continuation of Ser. No. 252,400, Sep. 30, 1988, abandoned, which is a continuation-in-part of Ser. No. 60,456, Jun. 11, 1987, abandoned.

[51] Int. Cl.$^6$ .................................................. G08L 77/00
[52] U.S. Cl. ........................... 524/538; 524/494; 525/420; 525/537
[58] Field of Search ...................... 525/420, 537; 524/538, 494

[56] References Cited

U.S. PATENT DOCUMENTS

| | | | |
|---|---|---|---|
| 4,292,416 | 9/1981 | Shue et al. | 525/420 |
| 4,528,335 | 7/1985 | Selby et al. | 525/420 |

*Primary Examiner*—Ana Woodward
*Attorney, Agent, or Firm*—Richard J. Scholtt; Stephen L. Hensley

[57] ABSTRACT

Polymer blends comprise a crystalline polyphthalamide component having high heat deflection temperature when filled with glass fibers and a polyarylene sulfide component.

13 Claims, No Drawings

POLYAMIDE-POLYARLENE SULFIDE BLENDS

CROSS-REFERENCE TO RELATED APPLICATIONS

This is a continuation-in-part of application Ser. No. 07/784,763, filed Oct. 30, 1991, and now abandoned which was a continuation of application Ser. No. 07/252,400, filed Sept. 30, 1988 and now abandoned, which was a CIP of application Ser. No. 07/060,456 filed Jun. 11, 1987 and now abandoned, which is incorporated herein by reference.

BACKGROUND OF THE INVENTION

This invention relates to blends comprising certain polyamides and polyarylene sulfides. More particularly, the invention relates to a blend of a polyarylene sulfide preferably a polyphenylene sulfide with a polyterephthalamide which, when filled with glass fibers, has a heat deflection temperature at 264 psi, according to ASTM D-648, above about 240° C., and to the corresponding filled blends containing fibrous or particulate fillers, preferably glass fibers.

Polyphthalamide compositions which, when filled with glass fibers and molded, have heat deflection temperatures at 264 psi, determined according to ASTM D-648, above about 240° C. are disclosed in the art. Among such polyphthalamides are polymers comprising recurring terephthalamide units, preferrably in combination with one or more other carboxylamide units, for example, adipamide or isophthalamide units. Compositions comprising such polyphthatamides, including particulate-filled and fiber-filled compositions, exhibit desirable thermal properties including high deflection temperature as well as high tensile strength and flexural modulus and are useful in various applications including preparation of molded articles, fibers, and laminates. Such compositions have utility in various applications, the neat and fiber-filled compositions being particularly suited for extrusion and molding applications.

Although these polyphthalamides have found wide acceptability for a great variety of end uses, the art continues to seek materials exhibiting still further improvement in such characteristics as solvent resistance and resistance to thermal-oxidative degradation, sometimes also referred to as thermal endurance. Such improvements would lead not only to longer useful life of products where demanding environments are encountered such as in under-the-hood automotive parts, but also utility in additional applications with even more stringent requirements.

In general, it is known that modification of polymer properties may be achieved in various ways. Modification of the molecular structure of a given composition through the use of additional monomers in polymerization can lead to desirable improvements in some properties. However, the same often are accompanied by loss of other desirable properties and use of additional monomers is not always practical due to process considerations. Addition of other materials to a polymeric composition may lead to property improvements without complicating a polymerization process; however the effects of additives often are unpredictable and, again, improvements in some properties often are achieved at the expense of other properties. For example, addition of high strength fibers such as glass or graphite fibers to polyamides is known to improve mechanical properties, such as tensile strength and flexural strengths and moduli, but these improvements are achieved at the expense of ductility. Blending a given polymer with one or more other polymers may give blends with a combination of properties intermediate of those of the individual components; however, processing requirements often limit the number of candidates that can be blended with a given polymer in an attempt to attain desirable property modifications and properties of a blend may or may not reflect those of its components depending on compatibility of the components with each other, reactivity thereof under blending or processing conditions and other factors.

Polyarylene sulfides are well known thermoplastics that find use in molding applications. As reported in "Technical Information On Ryton® Polyphenylene Sulfide Resins And Compounds" published by Phillips Petroleum Company, Plastics Technical Center, commercial polyphenylene sulfides designated Ryton polyphenylene sulfide exhibit excellent dimensional stability, inherent flame retardancy, thermal stability, chemical resistance, desirable electrical properties and ease of processing.

Blends of certain polyamides with polyarylene sulfides for various purposes to obtain blends having modified properties relative to those of the neat resin(s) are disclosed in the art. Blends containing from 0.01 to 10 wt % polyarylene sulfides with semicrystalline polyamides such as nylon 6 and polyamides obtained by condensation of a dibasic acid such as adipic, sebacic or terephthalic acid and a diamine such as hexamethylene diamine or 1,12-dodecanediamine that have improved molding characteristics and reduced warpage of parts molded therefrom are disclosed in U.S. Pat. No. 4,292,416. According to the patentee, the polyarylene sulfide useful in these blends must have a higher melting point than that of the polyamide. Inclusion of conventional additives for polyarylene sulfides, such as lubricants, stabilizers, pigments, dyes, fillers and plasticizers, also is disclosed. The patentee speculates that the improved properties of the blends result from a nucleating effect on the polyamide component imparted by the polyarylene sulfide component whereby crystallinity of the polyamide increases and properties dependent on degree of crystallinity are enhanced. The patentee also discloses that nucleation of polyamides can be accomplished through use of other such higher melting polymers which, during cooling, solidify prior to the polyamides so as to provide sites for nucleation.

U.S. Pat. No. 4,528,335, also assigned to Phillips Petroleum Company, discloses blends of amorphous polyamides, i.e., those having less than about 20 percent crystallinity, with polyarylene sulfides melting at about 260° to about 400° C. at weight ratios of 0.1:100 to about 100:100 are disclosed in U.S. Pat. No. 4,528,335. The blends, described to have improved impact strength and reduced shrinkage and warpage, may also contain fillers such as glass and carbon fibers.

Blends of low viscosity, uncrosslinked polyarylene sulfides not suited for injection molding, an epoxy compound and, optionally, a thermoplastic resin having a viscosity of at least 1,000 poise are disclosed in U.S. Pat. No. 4,528,346. According to the patentee such blends exhibit improved melt stability relative to commercially available injection molding grade polyarylene sulfides. Included among the various thermoplastic resins disclosed to be suitable as the optional component are polyamides. Adding fibers and inorganic fillers to such blends is also described.

Published Japanese Patent Application No. 55-135160 discloses blends of polyphenylene sulfide with nylon, unsaturated polyester or polyphenylene oxide resins, such resins being used to increase fluidity of the polyphenylene sulfide without sacrifices in other properties. Blends with nylon 6 and nylon 66 are specifically disclosed as are blends that contain glass fibers.

International Patent Application No PCT/US82/01688 (International Publication No. WO 83/02121), discloses adding a small amount of polyacrylamide or polyamide to a polyarylene sulfide melting from about 260° to about 400° C. to obtain compositions that are less corrosive to metals than neat polyphenylene sulfide. Among the disclosed polyamides are nylon 4, nylon 6, nylon 66, nylon 9, nylon 10, nylon 11, nylon 12, nylon 610, nylon 6T (polyhexamethylene terephthalamide), poly(p-phenylene terephthalamide), poly(m-phenylene isophthalamide), poly(N-N-diphenyl-p-phenylene isophthalamide), and polyamides derived from bis(paminocyclohexyl)methane and a dicarboxylic acid such as dodecanedioic acid. In the examples, blends containing up to 1 weight percent polyamide are disclosed.

International Patent Application No. PCT/NL85/00046 (International Publication No. WO 86/03212), discloses blends containing 5 to 50 weight percent polyarylene sulfide and 95 to 50 weight percent polytetramethylene adipamide. Use of mixtures of polytetramethylene adipamide with other polyamides in such blends also is disclosed as are blends containing fibers and particulate fillers.

U.S. Pat. Nos. 3,354,129, 3,862,095 and 3,790,536 disclose arylene sulfide polymers and processes for preparing them. These patents mention that such polymers can be blended with various materials including other polymers.

While the patents and publications discussed above disclose various blends, they do not disclose blends of a polyphthalamide component and a polyarylene sulfide component wherein the polyphthalamide component comprises terephthalamide units and which, when filled with 33 weight percent glass fibers, has a heat deflection temperature at 264 psi, according to ASTM D-648, above about 240° C. Further, the art does not disclose or suggest that blends of such a polyphthalamide component and a polyarylene sulfide component would exhibit the properties achieved according to this invention.

The art also does not disclose or suggest blends according to the invention comprising a polyphthalamide of fast or intermediate crystallization rate, as indicated by heat deflection temperature at 264 psi according to ASTM D-648 above about 240° C. when filled with 33 weight percent glass fibers, and a polyarylene sulfide component. Further, contrary to the teachings or express requirements of the art, it is not a requirement that the polyarylene sulfide melting point exceed polyamide melting point in the practice of the invention, and the melting points of some polyphthalamides found suitable for use in blends according to this invention exceed those of the polyarylene sulfide component by at least about 15° C.

It is an object of this invention to provide blends of a polyphthalamide component comprising terephthalamide units and, optionally, isophthalamide units and adipamide units which, when filled with 33 weight percent glass fibers, has a heat deflection temperature at 264 psi, according to ASTM D-648, above about 240° C. and a polyarylene sulfide component, as well as filled compositions based thereon having utility in molding and other applications. A further object of the invention is to provide such blends in which properties such as water absorption, methanol resistance, thermal endurance or flame resistance are improved relative to those of the polyphthalamide component. Other objects of the invention will be apparent to persons skilled in the art from the following.

SUMMARY OF THE INVENTION

The blends of this invention contain a polyphthalamide component comprising terephthalamide units which, when filled with 33 weight percent glass fibers, has a heat deflection temperature at 264 psi, according to ASTM D-648, above about 240° C., and a polyarylene sulfide component. Advantageously, such blends exhibit desirable thermal degradation temperatures, methanol resistance, water absorption, limiting oxygen index, thermal endurance and mechanical properties.

Filled compositions based on such blends also exhibit additional desirable properties such as improved tensile and flexural strengths and high heat deflection temperatures, and the invention thus is also directed to such filled compositions.

The invented blends normally exhibit two distinct melting points and glass transition temperatures, indicating substantial immiscibility of the polyphthalamide and polyarylene sulfide components. Although the mechanical properties of the blends generally fall between those of the components, as is often the case in blends of immiscible components, for compositions containing low-to-moderate levels of the polyarylene sulfide component, significant improvements in solvent resistance and thermal endurance relative to the polyphthalamide component are realized. In such blends, the polyarylene sulfide component is present as a separate, dispersed phase distributed through a matrix or continuous phase of the polyphthalamide component; it was not expected that the presence of such a discontinuous phase in the polyphthalamide matrix would yield the degree of improvement in retention of mechanical properties after thermal aging or immersion in solvents achieved according to the invention.

DESCRIPTION OF THE INVENTION

Briefly, the invented blends comprise a polyphthalamide, more particularly a polyterephthalamide which, when filled with glass fibers, has a heat deflection temperature at 264 psi, according to ASTM D-648, above about 240° C. and a polyarylene sulfide. The blends of this invention will contain from about 1 to about 99 weight percent, preferably from 10 to 90 weight percent of the polyphthalamide component and, correspondingly, from about 99 to about 1 weight percent, preferably from about 90 to about 10 weight percent polyarylene sulfide component, such weight percents being based on the total weight of polyphthalamide and polyarylene sulfide components.

These blends may also be filled with fibrous or particulate materials such as glass, graphite, boron, ceramic and aramid fibers, glass beads, calcium carbonate, graphite powder, pumice and the like, and the fillers may be used alone or in any combination. Filled blends according to the invention are particularly desirable because they combine the desirable blend properties with the high strength and other properties imparted by the fibers or particulates. Typically, amounts of such fibers or particulates range up to about 60 weight percent based on weight of the filled composition. Preferably, about 10 to about 50 weight percent of fibers or particulates is used to achieve desirable improvements in strength, modulus and heat deflection temperature without substantial sacrifices in processability of the filled composition. Glass fibers are especially preferred for molding applications.

The polyphthalamide component of the invented blends comprises terephthalamide units, and may optionally include additional carboxylamide units such as, for example, units selected from the group consisting of isophthalamide units and adipamide units.

The terephthalamide units may be structurally represented by the formula A below, and the optionally included isophthalamide units and adipamide units, may be represented respectively by the formulas B and C below.

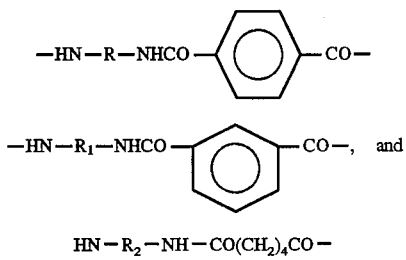

$$-HN-R-NHCO-\langle\bigcirc\rangle-CO- \qquad A$$

$$-HN-R_1-NHCO-\langle\bigcirc\rangle-CO-, \text{ and} \qquad B$$

$$HN-R_2-NH-CO(CH_2)_4CO- \qquad C$$

wherein R, $R_1$ and $R_2$ are independently divalent hydrocarbyl radicals and, preferably, divalent aliphatic hydrocarbyl radicals of 2 to about 14 carbon atoms.

In the formulas A, B and C depicted hereinabove, R, $R_1$ and $R_2$ are divalent hydrocarbyl radicals which can be the same or different. Straight chain, branched and cyclic aliphatic radicals and aromatic radicals are suitable. Preferably, R, $R_1$ and $R_2$ comprise an aliphatic radical of about 4 to about 20 carbon atoms, e.g., tetramethylene, hexamethylene, decamethylene, dodecamethylene and the like, alkyl-substituted aliphatic radicals such as methylpentamethylene, trimethylhexamethylene and the like, and cycloaliphatic radicals such as cyclohexylene, dicyclohexylmethane and the like. Polyphthalamides containing such radicals exhibit desirable thermal properties and good melt processibility, and raw materials for such polyphthalamides are readily available. Best results are achieved when R, R1 and R2 comprise hexamethylene or hexamethylene and trimethylhexamethylene, and especially when R, $R_1$ and $R_2$ consist of hexamethylene.

A variety of suitable polyphthalamides based on various aliphatic diamines are commercially available, and their preparation is disclosed in detail in commonly assigned U.S. Pat. No. 4,603,166, issued Jul. 29, 1986, the teachings of which are incorporated herein by reference.

A preferred polyphthalamide component of the invented blends comprises a semicrystalline polyphthalamide of fast or intermediate crystallization rate based on at least one aliphatic diamine and terephthalic acid. Particularly preferred are polyphthalamides based on at least one aliphatic diamine and terephthalic acid, isophthalic acid and adipic acid or terephthalic acid and adipic acid in which the mole ratio of the dicarboxylic acid moieties in units A, B and C, as depicted in the above formulas, is about 50–95:25–0:35–5, with about 65–75:25–15:10 being more preferred. Particularly preferred among such polyphthalamides are those wherein R, $R_1$ and $R_2$ in the above formulas comprise hexamethylene. Highly desirable polyphthalamides include those in which each of R, $R_1$ and $R_2$ is hexamethylene and the mole ratio of dicarboxylic acid moieties in the A, B and C units is about 65:25:10. Such polyphthalamides have melting points of about 305° to about 315° C. and generally have inherent viscosities of about 0.75 to about 1.4 dl/g, with about 1.0 to about 1.1 dl/g being preferred from the standpoint of melt stability and ease of processing. Heat deflection temperatures at 264 psi, according to ASTM D-648, of such polyphthalamides filled with 30–45 weight percent glass fibers and molded at about 120° C. generally range from about 480°–580° F. (250°–305° C.) as disclosed in U.S. Pat. No. 4,603,166.

Also disclosed therein and suitable as the polyphthalamide component of the invented blends are polyphthalamides of terephthalic acid, isophthalic acid and adipic acid compounds, in mole ratios of 65:35:0, 55:35:10, 60:30:10, 50:0:50 and 60:0:40, with hexamethylene diamine.

Among the polyphthalamides disclosed in U.S. Pat. No. 4,603,166, those melting at about 300° C. or greater are particularly suitable according to this invention. Generally, polyphthalamides based on terephthalic, isophthalic and adipic acids having mole ratios of the dicarboxylic acid moieties set forth above and aliphatic diamines of two to eight carbon atoms, i.e., polyphthalamides having recurring units corresponding to the above formulas wherein R, $R_1$ and $R_2$ are independently $C_{2-8}$ aliphatic radicals, melt above about 300° C. Specific examples of such diamines include tetramethylene diamine, pentamethylene diamine and hexamethylene diamine. Mixtures of aliphatic diamines of up to eight carbon atoms also can be employed as can mixtures of one or more such diamines with minor amounts of higher aliphatic diamines, e.g., those having nine to twelve carbon atoms. Generally, as terephthalamide content of such polyphthalamides increases, greater amounts of such higher aliphatic diamines and larger diamines can be used to obtain polyphthalamides that melt above about 300° C.

Another suitable example is the polyphthalamide of terephthalic acid, isophthalic acid and adipic acid in a mole fraction of 55/15/30 with hexamethylene diamine disclosed in Table 10 of published European Patent Application No. 84300744.4 (Publication No. 0121984). Especially preferred polyphthalamides are those wherein the heat deflection temperatures at 264 psi according to ASTM D-648 well in excess of about 240° C. when filled with 33 weight percent glass fibers and having glass transition temperatures less than 100° C. such that molding of the filled compositions to achieve such heat deflection temperatures can be carried out using steam-heated molds as opposed to more costly hot oil-heated systems. Mechanical properties, including tensile and flexural strength and modulus, of such polyphthalamides, particularly when filled with fibers or particulates, especially about 10 to about 60 weight percent glass fibers, together with their melt processibility and low water absorption tendencies (e.g., in the case of the 33 weight percent glass fiber filled polyphthalamides, water absorption generally is less than about four weight percent after immersion in boiling water for 120 hours) and good retention of mechanical properties when wet, make such polyphthalamide compositions particularly well suited as injection molding materials.

Also suitable as the polyphthalamide component of the invented blends are polyphthalamides prepared from dicarboxylic acid compounds comprising terephthalic acid and isophthalic acid compounds in a mole ratio of 80:20 to about 99:1 and hexamethylene diamine, optionally including additional diamines such as trimethylhexamethylene diamine in a mole ratio of about 98:2 to about 60:40. Such polyphthalamides, when filled with 33 weight percent glass fibers, have heat deflection temperatures at 264 psi according to ASTM D-648 of at least about 240° C. and are described in detail in commonly assigned U.S. Pat. No. 4,617,342, the teachings of which are incorporated herein by reference. Such polyphthalamides can offer advantages in terms of their extremely high heat deflection temperatures at 264 psi when filled with glass fibers and low water absorption due to an absence of adipamide units; however, melting points of such polyphthalamides are quite high, making melt processing more difficult.

Generally, it will be seen that suitable polyphthalamides may comprise units selected from the group consisting of terephthalamide, isophthalamide and adipamide units having mole ratios of dicarboxylic acid moieties in the units A, B and C in the above formulas within the broad ranges of 40–99:0–35:0–60, the proportions of the terephthalamide, isophthalamide and adipamide units as are present and the radicals R, $R_1$ and $R_2$ as represented in formulas A, B and C above being such that the heat deflection temperature of the polyphthalamide, when filled with 33 weight percent glass fibersand determined at 264 psi according to ASTM D-648, is at least about 240° C.

While precise relationships between composition and heat deflection temperature are not fully understood, a number of general principles provide guidance in providing polyphthalamides of suitable composition and properties for purposes hereof. Generally, melting temperature, rate of crystallization and level of crystallinity in copolyamides of terephthalic acid, isophthalic acid compounds and hexamethylene diamine increase with increasing terephthalamide to isophthalamide mole ratios, other things being equal. Heat deflection temperature at 264 psi according to ASTM D-648 of such copolyamides, when filled with 33 weight percent glass fibers, also increases with increased terephthalamide to isophthalamide mole ratios. Similarly, increasing heat deflection temperatures of glass-filled compositions at increasing terephthalamide plus adipamide to isophthalamide mole ratios in their terpolyamides with hexamethylene diamine can be seen from the aforementioned, commonly assigned U.S. Pat. No. 4,603,166. Yu et al., J. Poly. Sci., 42, 249 (1960) report that adipic acid and terephthalic acid are isomorphous in certain copolyamides, including those with hexamethylene diamine, such that replacement of terephthalic acid with adipic acid results in little change in melting point, although the authors acknowledge inability to prepare high terephthalic acid content copolyamides due to decomposition during the attempted preparations. Yu et al. also reports that crystallinity of polyamides decreases with increased branching of diamines used in preparation thereof, other things being equal.

Without wishing to be bound by theory, it appears that in the case of poly(hexamethylene phthalamides) consisting of at least two recurring units selected from the group consisting of hexamethylene terephthalamide, hexamethylene isophthalamide and hexamethylene adipamide units, there is a certain proportion of isophthalamide units, i.e., dicarboxylic acid moieties in units B in the above formulas, at or below which the polyphthalamides exhibit sufficient crystallinity and sufficiently high rates of crystallization during molding using a mold heated to at least Tg but below the melt crystallization temperature of the polyphthalamide that heat deflection temperatures at 264 psi, according to ASTM D-648, of the 33 weight percent glass fiber-filled compositions are normally at least about 240° C. Above a somewhat greater proportion of hexamethylene isophthalamide units, crystallinity and rates of crystallization are so low that the so-determined heat deflection temperatures of the 33 weight percent glass fiber-filled compositions normally are less than about 240° C. Between these levels of isophthalamide units, the so-determined heat deflection temperatures of the 33 weight percent glass fiber-filled compositions are normally at least about 240° C. provided that the remaining units of the composition include hexamethylene terephthalamide units and the mole ratio of hexamethylene terephthalamide units to hexamethylene isophthalamide units is high enough.

More specifically, such poly(hexamethylene phthalamides) consisting of about 19 to about 35 mole percent hexamethylene isophthalamide units based on total amide units, i.e., wherein the dicarboxylic acid moieties in units corresponding to the formula B above are about 19 to about 35 mole percent of the total dicarboxylic acid moieties, when filled with 33 weight percent glass fibers and molded using a mold heated above Tg but below Tcm normally have heat deflection temperatures at 264 psi according to ASTM D-648 of at least about 240° C. when the mole percentage of hexamethylene terephthalamide units (i.e, dicarboxylic acid moieties in units corresponding to formula A above) is at least about four times the mole percent hexamethylene isophthalamide units minus 75 percent. At hexamethylene isophthalamide unit contents in the upper portion of the aforesaid range of about 19 to about 35 mole percent, use of nucleants, higher mold temperatures, annealing and other techniques for promoting crystallization can be employed to facilitate attainment of heat deflection temperatures at 264 psi of at least about 240° C. according to ASTM D-648 in respect of the 33 weight percent glass fiber-filled polyphthalamides. Below about 19 mole percent hexamethylene isophthalamide units, heat deflection temperatures at 264 psi according to ASTM D-648 of the so-filled and so-molded compositions normally exceed about 240° C. whether the remaining units are all hexamethylene terephthalamide units, all hexamethylene adipamide units or a combination of hexamethylene terephthalamide units and hexamethylene adipamide units in any proportion. Above about 35 mole percent hexamethylene isophthalamide units, the poly(hexamethylene phthalamides) normally are amorphous or so slow to crystallize that the requisite heat deflection temperature at 264 psi according to ASTM D-648 normally is not attained even with the use of nucleating agents, annealing or high temperature molds. Thus, polyphthalamides comprising at least two recurring units selected from the group consisting of terephthalamide, isophthalamide and adipamide units which, when filled with 33 weight percent glass fibers, have heat deflection temperatures according to ASTM D-648g of at least about 240° C. include poly(hexamethylene phthalamides) consisting of at least two recurring units selected from the group consisting of hexamethylene terephthalamide, hexamethylene isophthalamide and hexamethylene adipamide units wherein the mole percent of the dicarboxylic acid moieties in the hexamethylene isophthalamide units based on total dicarboxylic acid moieties is 0 to about 35 mole percent; provided that when the mole percent of dicarboxylic acid moieties in the hexamethylene isophthalamide units is about 19 to about 35 mole percent, the mole percentages of dicarboxylic acid moieties in the hexamethylene terephthalamide, hexamethylene adipamide and hexamethylene isophthalamide units based on total dicarboxylic acid moieties (referred to below as $M_T$, $M_A$ and $M_I$, respectively) satisfy the following formulas:

$$M_T \geq (4 \times M_I) - 75\% \tag{1}$$

$$M_T + M_I + M_A = 100\% \tag{2}$$

Other suitable polyphthalamide compositions, for example, those based on diamines other than or in addition to hexamethylene diamine or comprising, in addition to recurring units selected from terephthalamide, isophthalamide and adipamide units, other dicarboxylic acid amide units, can be employed if desired, suitability of specific compositions being easily determined based on heat deflection temperatures at 264 psi of the 33 weight percent glass-filled compositions according to ASTM D-648 using a mold heated to above Tg but below Tcm of the polyphthalamide.

The polyphthalamides useful in the practice of this invention may be also described as having a fast or intermediate rate of crystallization. For purposes hereof, such polyphthalamides are characterized as fast crystallizing if the heat deflection temperature at 264 psi according to ASTM D-648 of the polyphthalamide composition filled with 33 weight percent glass fibers and molded using a mold heated above the glass transition temperature ("Tg") but below the melt crystallization temperature ("Tcm") of the polyphthalamide normally is at least about 240° C. and heat deflection temperature at 66 psi according to ASTM D-648 of the untilled polyphthalamide molded using a so-heated mold normally is at least about 220° C. Intermediate crystallizing polyphthalamides, for purposes hereof, are characterized by heat deflection temperatures at 264 psi according to ASTM D-648 normally of at least about 240° C. when so-filled and molded and heat deflection temperatures at 66 psi according to ASTM D-648 normally below about 220° C. in the case of the so-molded, unfilled compositions. Polyphthalamides with heat deflection temperatures at 264 psi according to ASTM D-648 normally below about 240° C. when so-filled and injection molded are slow-crystallizing or amorphous polyamides and are not suitable according to this invention because blends thereof with polyarylene sulfides exhibit low heat deflection temperatures and have poor chemical resistance unless polyarylene sulfide content of the blends is very high. Further, the slow crystallizing polyphthalamides can undergo crystallization during use at elevated temperatures of articles fabricated therefrom, resulting in dimensional change and premature failure.

While the polyphthalamide component of the invented blends is described herein in terms of heat deflection temperature of at least about 240° C. when filled with 33 weight percent glass fibers, it will be understood that such heat deflection temperatures often are also achieved at different fiber levels, the 33 weight percent level being chosen as a convenient reference point. Glass fibers of the type commonly utilized to prepare glass fiber-filled polyamide compositions suitable for injection molding can be used in the determination of heat deflection temperature. Compounding of such glass fibers with the polyphthalamide is conducted so that substantially uniform dispersion of fibers in the polyphthalamide is achieved. It also will be understood that heat deflection temperatures of the 33 weight percent glass fiber-filled polyphthalamide component of the invented blends can vary with molding conditions, including mold temperature and, to a lesser extent, cycle time, barrel temperature and injection pressure. Accordingly, while the polyphthalamide component of the invented blends is defined in terms of a heat deflection temperature at 264 psi according to ASTM D-648 in respect of the 33 weight percent glass fiber-filled resin, it will be understood that resins having the specified heat deflection temperatures under appropriate conditions are suitable according to this invention even though molding conditions may be varied to avoid attaining such heat deflection temperatures. As indicated above, heat deflection temperatures of at least about 240° C. normally are attained using a mold heated to above Tg but below Tcm of the polyphthalamide for 33 weight percent glass fiber-filled compositions containing the polyphthalamides suitable according to this invention. Use of nucleants and annealing also can facilitate achieving the specified heat deflection temperatures. Suitable glass fibers, compounding and molding conditions are illustrated in the examples appearing hereinbelow.

The polyphthalamide component of the invented blends may be selected from among the variety of commercially-available polyphthalamides such as the A-1000 and A-4000 grades of Amodel® polyphthalamide resins available from Amoco Polymers, Inc. and the Arlen resins supplied by the Mitsui Company. Other suitable polyphthalamides including polyterephthalamides have been disclosed in the art and these may also be or become available from commercial sources. Alternatively, the polyphthalamides may be prepared from the appropriate starting materials, e.g., dicarboxylic acids or their derivatives and diamines, in suitable proportions by any suitable means. As disclosed in U.S. Pat. No. 4,603,166, one such preparation involves a salt preparation step, preferably conducted batchwise to achieve proper stoichiometry, wherein dicarboxylic acid compounds, diamine and solvent are added to a suitable reaction vessel in appropriate amounts and maintained under conditions effective to cause salt formation but avoid appreciable conversion of salts to oligomers. Water is a preferred solvent and temperature is preferably maintained below about 120° C. to minimize conversion. Product of the salt preparation step can be introduced into a condensation section operated either batchwise or in continuous mode. In the condensation section substantial conversion of salts to polymer takes place. The condensation product then typically is introduced into a finishing section, such as a twin-screw extruder, to obtain further conversion and generally increase inherent viscosity from a level of about 0.1 to about 0.6 dl/g achieved in the condensation section up to about 0.8 dl/g or greater. The polymeric product can be recovered from the finishing section and, for example, pelletized or mixed with fillers, additives and the like. Commonly assigned U.S. Pat. No. 4,603,193 also is directed to preparation of such polyamides.

Polyarylene sulfides suitable for use in the blends according to the invention are those having a melting point up to about 285° C. and comprising in their molecules recurring arylene sulfide groups. Such materials and preparation thereof are widely known and are disclosed in the art, for example, in U.S. Pat. No. 3,354,129, issued Nov. 1, 1967, U.S. Pat. No. , 790,536, issued Feb. 5, 1974, and U.S. Pat. No. , 862,095, issued Jan. 21, 1975, each of which is incorporated herein by reference. Generally, polyarylene sulfides can be prepared from polyhalo-substituted aromatic compounds, such as 1,4-dichlorobenzene, and a suitable sulfur containing compound such as sodium sulfide, sodium hydrosulfide or hydrogen sulfide, at elevated temperature in a polar, organic solvent. Preferably, the polyarylene sulfide comprises a polyphenylene sulfide. More preferably an injection moldable polyphenylene sulfide melting at about 260° to about 280° C. is used. Specific examples of polyphenylene sulfides suitable for the purposes of this invention are those disclosed and sold commercially for injection molding applications, including Ryton® P4 Polyphenylene Sulfide manufactured by Phillips Petroleum Company and Tophren® T4 Polyphenylene Sulfide manufactured by Tophren Company, Ltd. These materials generally are available commercially in powder or pellet form, either being suitable for the present invention. Commercially available fiber-filled grades of polyphenylene sulfides may also be used to prepare fiber-filled blends according to this invention.

As noted, the blends of this invention may contain from about 1 to about 99 weight percent of the polyphthalamide component and, correspondingly, from about 99 to about 1 weight percent polyarylene sulfide component, based on the total weight of polyphthalamide and polyarylene sulfide components. Preferably, the polyarylene sulfide content of the invented blends will be greater than about 10 weight percent since for lower levels of polyarylene sulfide little change in properties relative to those of the polyphthalamide component is seen. More preferably, polyphthalamide component content is about 70 to about 90 weight percent and polyarylene sulfide component content is about 10 to about 30 weight percent because desirable mechanical properties of the polyphthalamide component are retained in the blends with significant improvements in solvent resistance and thermal endurance. For blends containing small amounts of the polyphthalamide component, and particularly at levels below about 10 wt %, there is little benefit to blend properties.

The blends according to this invention may be prepared by any suitable means. Conveniently, polyphthalamide and polyarylene sulfide components in powder or pellet form are melt blended in desired amounts at temperatures effective to render the blend components molten without degradation thereof in a high shear mixer, e.g., a twin-screw extruder, to obtain a desirably uniform blend. In view of the immiscibility of the blend components, use of kneading blocks or other suitable mixing elements is preferred in order to achieve a high degree of dispersion of the components. To minimize degradation of the blend and its components, preferred temperatures when using a twin-screw mixer are equal to or up to about 20° C. greater than the melting point of the highest melting component of the blends. Blending of the components in solid form, such as powder or pellets, prior to melt blending can be conducted to facilitate melt blending. Particulates and fibers can be incorporated into one or more of the blend components prior to blending them or into the blends by physical mixing with the blends in powder or pellet form and then extrusion compounding the result, by feeding the particulates or fibers to the molten blend in an extruder or other compounding apparatus or by other suitable methods. Blending of polyphthalamide and polyarylene sulfide components and incorporation of particulates or fillers can be accomplished in a single pass through an extruder or other suitable apparatus by mixing and blending the polymeric components in an upstream section of the equipment and then adding the fibers or fillers to the molten, blended components in a downstream portion of the equipment.

The invented blends also may contain pigments, stabilizers, flame retardants, nucleating agents, lubricants, impact modifiers and other suitable additives to improve or modify blend properties. A preferred heat stabilizer package is a combination of potassium iodine and cupric acetate.

Such blends may be found particularly useful as unfilled and filled injection molding compounds for production of molded objects such as electronic connectors, switch components, pump housings, valve components and under-the-hood automobile parts. Injection molding, extrusion and similar fabriction of the blends will generally be conducted using standard processing equipment conventionally employed in the art for such purposes. The invented blends may also be formed into fibers or films, including film laminates by conventional processing operations, and may be conveniently employed as matrix materials or binders in the fabrication of composite or laminated structures.

The present invention is described further in connection with the following examples, it being understood that the same are for purposes of illustration. In the examples and tables, examples of blends according to the invention are designated by Arabic numerals, comparative examples are designed by Roman numerals, with blends according to those comparative examples being designated by capital letters. Neat resins used in the blends of the examples and comparative examples also are designated by capital letters.

EXAMPLE 1

Polyphthalamide components A, B and C, were prepared from terephthalic acid, isophthalic acid, adipic acid and hexamethylene diamine in a mole ratio of about 65:25:10:100 as follows:

To a large, stainless steel, stirred reactor having an oil jacket heating system were added quantities of a 70–80 wt. % solution of hexamethylene diamine in water, adipic acid, isophthalic acid and terephthalic acid. About one mole percent benzoic acid, based on total moles of diamine and diacids, was added as a capping agent. Temperature increased during addition of the acids to 70° C. 800 parts per million sodium hypophosphite catalyst then were added to the reactor after which it was sealed, purged with nitrogen, leaving a 5.64 kg/cm$_2$ (80 psig) nitrogen blanket in the reactor, and then heated to about 120° C. and held at that temperature. A second such reactor was charged, purged and heated in like manner and the two reactors were used in parallel to provide continuous feed of salt solution to downstream processing by alternating between the two reactors.

Contents of the salt reactors were pumped continuously to a jacketed, oil-heated, stirred tank and maintained under pressure of 12.7 kg/cm$_2$ (180 psig) therein using a microprocessor-controlled Research Control Valve. The reactor was heated to about 220° C. Residence time in the reactor under such conditions was about 15 minutes, resulting in decrease in water content from about 35 wt. % based on weight of the materials in the initial charge to about 15 wt. % based on weight of material exiting the stirred tank.

Contents of the tank were pumped continuously to and through two jacketed, oil heated, stainless steel pipes of 0.95 cm inner diameter and lengths of 274 and 401 cm in series at a rate of about 8.2 kg/hour using a dual headed Bran-Lubbe piston pump. The first pipe was maintained at about 315°–325° C. and the second at about 325°–335° C. both under pressure of about 128 kg/cm$_2$ (1820 psi).

Contents of the second heated pipe were passed continuously through the Research Control Valve to a jacketed tube of about 0.94 cm inner diameter and about 274 cm length, equipped with thermocouples to monitor temperatures in the tube and between the outer wall of the tube and inner wall of the jacket, under pressure of about 7.8 kg/cm$_2$ (110 psig) with 325°–345° C. heat exchange fluid circulating in the heating jacket. Flashing of volatiles in the feed to the tube occurred in an upstream portion thereof.

Contents of the tube, comprising water vapor and molten polymer, were introduced onto the screws of a Werner and Pfleiderer Corporation ZSK-30, twin-screw extruder. Volatiles were allowed to escape through a rear vent in the extruder barrel. Polymer was conveyed between screw flights with the screws rotating at 100 rpm and the extruder barrel heated at 300° to 330° C. Polymer was extruded through a strand die of about 0.24 cm diameter, passed into a water bath and then chopped into pellets. Inherent viscosity of the resulting polyphthalamide, identified hereinbelow as A, was about 0.88 dl/g. Melting point was 312° C. Melt crystallization temperature was 270° C.

Polyphthalamide B was prepared substantially as described above except that pressure in the tube was slightly higher and temperature of the heat exchange fluid circulated around the tube was about 300°–345° C. Inherent viscosity was about 0.98 dl/g and melting point was 310° C. Melt crystallization temperature was 260° C.

Polyphthalamide C was prepared substantially as described above except pressure in the two pipes in series was about 151 kg/cm$_2$ (2150 psig) and pressure in the tube was about 6.4 kg/cm$_2$ (90 psig). Inherent viscosity was about 0.87 dl/g and melting point was 304° C. Melt crystallization temperature was 264° C.

While polyphthalamides A, B and C were of like composition and prepared similarly, mechanical properties of Polyphthalamide A were generally lower than those of Polyphthalamides B and C, as can be seen from Tables 1 and 4–6 below, for unknown reasons. Mechanical properties of Polyphthalamides B and C are more representative of those of the 65:25:10 hexamethylene terephthalamide, hexamethylene isophthalamide, hexamethylene adipamide polyphthalamides than those of Polyphthalamide A.

EXAMPLE 2

A blend of ten parts by weight of a commercially available polyphenylene sulfide powder, identified as Ryton P4 from Phillips Petroleum Company and having a melting point of 277° C., with ninety parts by weight of Polyphthalamide A from EXAMPLE 1 was prepared by physically mixing 150 grams of the polyphenylene sulfide and 1350 grams of the polyphthalamide in a sealed bucket and tumbling the bucket for about 3 minutes. The mixture was fed to a Werner & Pfleiderer Corporation ZSK-30 twin-screw extruder at a rate of about 75 grams/minute. Extruder operating conditions and barrel temperature profile were as follows:

|      | Barrel Temperatures (°C.) |           |
|------|---------------------------|-----------|
| Zone | Setting                   | Indicated |
| 1    | 79                        | 113       |
| 2    | 149                       | 158       |
| 3    | 204                       | 213       |
| 4    | 299                       | 301       |
| 5    | 299                       | 303       |
| 6    | 299                       | 301       |
| 7    | 299                       | 306       |
| 8    | 299                       | 300       |

Melt Temperature: 293° C.
Screw Speed: 50 rpm
Screw Torque: 20%

Screw configuration in the extruder consisted of sections having relatively long pitch in zones 1 and 2, spike-like sections in zone 3, compression sections in zones 4 and 5 and sections of longer pitch in zones 6 and 7. Gas present in the polymer melt was allowed to escape from the extruder barrel through a vent port located in zone 7.

The molten blend exited the extruder through a strand die having a circular, 0.24 cm diameter orifice. The extrudate was cooled and chopped into pellets as in EXAMPLE 1.

Subsequently, the pellets were dried in a pumped vacuum oven at 110° C. (230° F.) and 0.35 mm Hg for 24 hours and then injection molded into test bars using an Arburg Injection Molding Machine operated as follows:

| Mold Temperature Setting: | 93° C. |
|---|---|
| Rear Zone Setting: | 293° C. |
| Front Zone Setting: | 304° C. |
| Nozzle Setting: | 304° C. |
| Injection Pressure: | 21–42 kg/cm$_2$ |
| Holding Pressure: | 18–28 kg/cm$_2$ |
| Back Pressure: | 3.5–7 kg/cm$_2$ |
| Screw Speed: | 160–180 rpm |
| Injection Speed Setting: | 5 |
| Injection Time Setting: | 10 seconds forward, 20 seconds hold |
| Total Cycle Time: | 44 seconds |

Physical properties of the test bars were determined according to the following methods:

| Tensile Properties (including Ultimate Tensile Strength ("UTS") and Elongation at Break): | ASTM D-638 Type I test bars tested at 5 cm/minute); |
|---|---|
| Flexural Properties: | ASTM D-790; |
| Notched Izod Impact Strength: | ASTM D-256; |
| Tensile Impact Strength: | ASTM D-1822 (type S test bars); |
| Heat Deflection Temperature ("HDT"): | ASTM D-648; |
| Water Absorption: | ASTM D-570; |
| Methanol Exposure | ASTM D-543; |
| Limiting Oxygen Index (LOI): | ASTM D-2863; |
| Glass Transition Temperature (Tg), Melting Temperature (Tm) and Melt Crystallization Temperature (Tcm): | Pellets tested by Differential Scanning Calorimetry at 20° C./minute. |
| Degradation Temperature: | Pellets tested by Thermal Gravimetric Analysis at a 10° C./minute scan rate under nitrogen |

Test results are reported in TABLE 1 below. In accordance with the ASTM test methods identified above, an average of results for the number of samples specified in the test methods is reported in TABLE 1 and subsequent tables.

EXAMPLES 3–4

Following essentially the procedure of EXAMPLE 2, a series of compositions was prepared from the materials used in that example but with variations in levels of polyphenylene sulfide and polyphthalamide components. Samples of neat polyphthalamide A from EXAMPLE 1 and neat polyphenylene sulfide used in EXAMPLES 2–4 also were processed in the ZSK-30 twin-screw extruder essentially as in EXAMPLE 2 to provide comparable thermal history. Test bars were molded from the blends and neat resins according to the procedure of EXAMPLE 2 and tested as described therein. Properties and molding conditions are reported in TABLE 1. In the table the neat polyphenylene sulfide is designated "D".

TABLE 1

| | Example | | | | |
|---|---|---|---|---|---|
| | A | 2 | 3 | 4 | D |
| Polyphthalamide/Polyphenylene Sulfide (wt. %) | 100/0 | 90/10 | 50/50 | 10/90 | 0/100 |
| UTS (kg/cm$_2$) | 754 | 609 | 124* | 321* | 461 |
| Elongation at Break (%) | 3.2 | 2.52 | 0.60 | 1.26 | 1.47 |
| Flexural Strength (kg/cm$^2$) | >1556 | 1184 | 747 | 740 | 719 |
| Flexural Modulus (× 10$_3$ kg/cm$^2$) | 33.5 | 35.9 | 38.5 | 40.5 | 44.7 |
| Notched Izod (cm-kg/cm) | 3.3 | 3.1 | 1.8 | 1.3 | 1.1 |
| Tensile Impact (cm-kg/cm$^2$) | 84 | 60 | 30 | 26 | 32 |
| HDT @ 264 psi (°C.) | 104 | 126 | 115 | 103 | 101 |
| Limiting Oxygen Index (%) | 24 | 24 | 33 | 40 | 40 |
| Tg (°C.) | 117 | 124 | 123 | | |
| | | | 87 | 85 | 85 | 85 |
| Tm (°C.) | 312 | 313 | 307 | | |

TABLE 1-continued

| | Example | | | | |
|---|---|---|---|---|---|
| | A | 2 | 3 | 4 | D |
| | | 281 | 280 | 279 | 277 |
| Degradation Temp. (°C.) | 369 | 415 | 404 | 427 | 467 |
| Mold Temperature (°C.) | 93 | 93 | 93 | 93 | 93 |
| Barrel Temperature (°C.) | | | | | |
| Rear Zone | 310 | 293 | 293 | 293 | 282 |
| Front Zone | 318 | 304 | 304 | 304 | 288 |
| Nozzle | 318 | 304 | 304 | 304 | 288 |

*These values are not representative because test bars broke at clamps of the testing device.

EXAMPLES 5-7

Glass fiber-filled compositions were prepared from the blends of EXAMPLES 2–4 and the neat polyphthalamide and polyphenylene sulfide resins used to prepare such blends. The filled materials were prepared by grinding the blends or neat resins to about 2 mm particle size and then physically mixing the same with commercially available, 0.32 cm long glass fibers identified as PPG 3540 from PPG Industries, Inc., in amounts sufficient to yield filled compositions containing 33 wt. % glass fibers based on weight of the filled compositions. Physical mixing was accomplished using the bucket tumbler as in EXAMPLE 2. Test bars were molded under conditions shown in TABLE 2 and otherwise according to the procedure and under conditions of EXAMPLE 2. Test bars were evaluated as in EXAMPLE 2 and results are reported in TABLE 2.

TABLE 2

| | Example | | | | |
|---|---|---|---|---|---|
| Blend or Neat Resin from Example | E A | 5 2 | 6 3 | 7 4 | F D |
| UTS (kg/cm$^2$) | 1909 | 2346 | 1402 | 1437 | 1564 |
| Elongation at Break (%) | 4.0 | 3.8 | 2.2 | 2.5 | 2.7 |
| Flexural Strength (kg/cm$^2$) | 2875 | 3396 | 2269 | 2494 | 2381 |
| Flexural Modulus ($\times 10^3$ kg/cm$^2$) | 105 | 116 | 116 | 130 | 121 |
| Notched Izod (cm-kg/cm) | 17.4 | 17.4 | 19.6 | 17.4 | 16.4 |
| Tensile Impact (cm-kg/cm$^2$) | 228 | 231 | 129 | 162 | 160 |
| HDT @ 264 psi (°C.) | 282 | 292 | 273 | 275 | 271 |
| Mold Temperature (°C.) | 93 | 93 | 93 | 93 | 93 |
| Barrel Temperature (°C.) | | | | | |
| Rear Zone | 310 | 310 | 310 | 310 | 310 |
| Front Zone | 321 | 321 | 321 | 321 | 321 |
| Nozzle | 321 | 321 | 321 | 321 | 321 |

EXAMPLES 8-10

Following essentially the procedure of EXAMPLE 2, blends were prepared from the Polyphthalamide A of EXAMPLE 1 and a polyphenylene sulfide, Tophren T-4 polyphenylene sulfide from Tophren Co. Ltd., having a melting point of 280° C. and designated as "G". Test bars were prepared and evaluated as in EXAMPLE 2; evaluation results and molding conditions are shown in TABLE 3. The neat resins were processed in the ZSK-30 extruder in similar manner to provide comparable thermal history.

TABLE 3

| | Example | | | | |
|---|---|---|---|---|---|
| | A | 8 | 9 | 10 | G |
| Polyphthalamide/ Polyphenylene Sulfide (wt. %) | 100/0 | 90/10 | 70/30 | 50/50 | 0/100 |
| UTS (kg/cm$^2$) | 754 | 803 | 571 | 345* | 486 |
| Elongation at Break (%) | 3.2 | 3.7 | 2.5 | 1.4 | 1.8 |
| Flexural Strength (kg/cm$^2$) | >1556 | 1409 | 1310 | 860 | 1050 |
| Flexural Modulus ($\times 10^3$ kg/cm$^2$) | 33.5 | 35.6 | 36.1 | 37.3 | 37.8 |
| Notched Izod (cm-kg/cm) | 3.3 | 3.1 | 2.6 | 1.3 | 1.3 |
| Tensile Impact (cm-kg/cm2) | 84 | 93 | 86 | 45 | 39 |
| HDT @ 264 psi (°C.) | 104 | 110 | 111 | 111 | 114 |
| Tg (°C.)** | 117 | 108 | 108 | 110 | 86 |
| Tm (°C.)** | 312 | 306 | 280 | 283 | 280 |
| Degradation Temp. (°C.) | 369 | 412 | 409 | 407 | 414 |
| Water Absorption (wt. % after 24 hours) | 0.66 | 0.58 | 0.44 | 0.26 | 0.06 |
| Retained UTS (% after 24 hrs in boiling MeOH) | 70 | 94 | 100 | 112 | 94 |
| Mold Temperature (°C.) | 93 | 93 | 93 | 93 | 104 |
| Barrel Temperature (°C.) | | | | | |
| Rear Zone | 310 | 310 | 310 | 310 | 282 |
| Front Zone | 318 | 318 | 318 | 318 | 288 |
| Nozzle | 318 | 318 | 318 | 318 | 288 |

Notes:
*This value is not representative because test bars broke at clamps of the testing device.
**Second Tgs and Tms for the blends of Examples 8–10 were not observed.

EXAMPLES 11-14

Following essentially the procedure of EXAMPLE 2, a series of blends was prepared from the polyphenylene sulfide used in EXAMPLE 2 and Polyphthalamide B from EXAMPLE 1. Test bars were prepared from the blends and the neat resins, processed in like manner to provide comparable thermal history, and tested as in EXAMPLE 2, results and molding conditions being reported in TABLE 4. Also reported in the table are results for test bars molded from a commercial pellet grade polyphenylene sulfide, Ryton R-6 Polyphenylene Sulfide from Phillips Petroleum Company. That material is designated "H" in the table

TABLE 4

|  | \multicolumn{7}{c}{Example} |
| --- | --- | --- | --- | --- | --- | --- | --- |
|  | B | 11 | 12 | 13 | 14 | D | H |
| Polyphthalamide/Polyphenylene Sulfide (wt. %) | 100/0 | 90/10 | 85/15 | 50/50 | 10/90 | 0/100 | 0/100 |
| UTS (kg/cm$^2$) | 916 | 845 | 754 | 358 | 339 | 368 | 390 |
| Elongation at Break (%) | 4.1 | 3.2 | 2.8 | 1.3 | 1.1 | 1.2 | 1.6 |
| Flexural Modulus (× 10$^3$ kg/cm$^2$) | 35.7 | 39.6 | 39.9 | 39.7 | 42.1 | 43.7 | 41.5 |
| Notched Izod (cm-kg/cm) | 8.7 | 5.4 | 4.9 | 2.7 | 2.7 | 2.7 | 1.9 |
| Tensile Impact (cm-kg/cm$^2$) | 138 | 127 | 99 | 30 | 26 | 21 | 26 |
| LOI (%) | 22 | 24 | 25 | 32 | 39 | 38 | ND |
| Tg (°C.) | 118 | 121 | 123 | 119 |  |  |  |
|  |  |  |  | 87 | 84 | 83 | 85 | 85 |
| Tm (°C.) | 310 | 313 | 312 | 307 | 277 | 279 | 271 |
|  |  | 280 | 279 | 279 |  |  |  |
| HDT @ 264 psi (°C.) | 117 | 122 | 123 | 114 | 99 | 97 | 102 |
| Water Absorption (wt. % after 24 hours) | 0.72 | 0.66 | 0.60 | 0.30 | 0.09 | 0.03 | ND |
| Retained UTS (% after 24 hrs in boiling MeOH) | 72 | 68 | 73 | ND* | 82 | 68** | ND |
| Mold Temperature (°C.) | 93 | 93 | 93 | 93 | 93 | 93 | 93 |
| Barrel Temperature (°C.) |  |  |  |  |  |  |  |
| Rear Zone | 310 | 293 | 293 | 293 | 293 | 277 | 293 |
| Front Zone | 332 | 304 | 304 | 304 | 304 | 282 | 304 |
| Nozzle | 321 | 304 | 304 | 304 | 304 | 282 | 304 |

Notes:
*ND indicates that the property in question was not determined.
**This value is an average of five widely divergent test values. Retesting gave an average value of 98% without significant divergence among individual values.

EXAMPLES 15–18

EXAMPLES 11–14 were repeated except that the extruder was equipped with kneading blocks to promote better blending. Results and conditions are reported in TABLE 5.

TABLE 5

|  | \multicolumn{6}{c}{Example} |
| --- | --- | --- | --- | --- | --- | --- |
|  | B | 15 | 16 | 17 | 18 | D |
| Polyphthalamide/Polyphenylene Sulfide (wt. %) | 100/0 | 90/10 | 85/15 | 50/50 | 10/90 | 0/100 |
| UTS (kg/cm$^2$) | 1099 | 887 | 817 | 263 | 433 | 440 |
| Elongation at Break (%) | 5.82 | 3.75 | 3.33 | 0.92 | 1.42 | 1.34 |
| Flexural Modulus (× 10$^3$ kg/cm$^2$) | 34.5 | 34.7 | 36.2 | 37.6 | 42.1 | 46.1 |
| Retained UTS (% after 24 hrs in boiling MeOH) | 67 | 73 | 76 | 76 | 79 | 95 |
| Notched Izod (cm-kg/cm) | 7.8 | 5.0 | 3.7 | 0.87 | 0.87 | 0.87 |
| Tensile Impact (cm-kg/cm$^2$) | 155 | 67 | 32 | 35 | 28 | 30 |
| LOI (%) | 24 | 24 | 26 | 33 | 37 | 37 |
| HDT @ 264 psi (°C.) | 116 | 118 | 116 | 105 | 104 | 100 |
| Tg (°C.) | 104 | 115 | 113 | 116 | 119 |  |
|  |  | 93 | 91 | 83 | 88 | 89 |
| Tm (°C.) | 311 | 311 | 311 | 306 |  |  |
|  |  | 280 | 279 | 279 | 278 | 278 |
| Degradation Temp. (°C.) | 398 | 410 | 401 | 398 | 392 | 462 |
| Mold Temperature (°C.) | 93 | 93 | 93 | 93 | 93 | 93 |
| Barrel Temperature (°C.) |  |  |  |  |  |  |
| Rear Zone | 310 | 293 | 293 | 293 | 293 | 277 |
| Front Zone | 332 | 304 | 304 | 304 | 304 | 282 |
| Nozzle | 321 | 304 | 304 | 304 | 304 | 282 |

EXAMPLES 19–22

Following essentially the procedure of Example 2, a series of blends was prepared from Polyphthalamide C from Example 1 and Tophren T4 polyphenylene sulfide (different lot than used in EXAMPLES 8–10) melting at 275° C., designated "T" in TABLE 6. Test bars prepared in like manner in the ZSK-30 extruder as in Example 2 were evaluated; results and molding conditions are reported in TABLE 6.

TABLE 6

|  | C | 19 | 20 | 21 | 22 | I |
|---|---|---|---|---|---|---|
| Polyphthalamide/Polyphenylene Sulfide (wt. %) | 100/0 | 90/10 | 70/30 | 50/50 | 10/90 | 0/100 |
| UTS (kg/cm$^2$) | 1036 | 965 | 599 | 437 | 540 | 561 |
| Elongation at Break (%) | 4.7 | 4.5 | 2.5 | 1.6 | 2.0 | 2.2 |
| Retained UTS (% after 24 hours in boiling MeOH) | 63 | 63 | 89 | 85 | 96 | 100 |
| Retained UTS (% after 24 hours in 93° C. acetic acid) | 56 | 54 | 85 | 88 | 99 | 99 |
| Notched Izod (cm-kg/cm) | 4.4 | 4.9 | 1.1 | 1.1 | 1.1 | 1.1 |
| Tensile Impact (cm-kg/cm$^2$) | 86 | 84 | 60 | 54 | 54 | 60 |
| HDT at 264 psi (°C.) | 112 | 115 | 103 | 100 | 101 | 102 |
| LOI (%) | 23 | 24 | 26 | 32 | 44 | 43 |
| Tg (°C.) | 130 | 120 | 132 | 122 | 120 | |
|  |  | 102 | 80 | 88 | 103 | 85 |
| Tm (°C.) | 304 | 307 | 308 | 307 |  |  |
|  |  | 278 | 277 | 276 | 277 | 275 |
| Mold Temperature (°C.) | 93 | 93 | 93 | 93 | 93 | 93 |
| Barrel Temperature (°C.) |  |  |  |  |  |  |
| Rear Zone |  | 310 | 310 | 304 | 304 | 282 |
| Front Zone |  | 318 | 318 | 310 | 310 | 288 |
| Nozzle |  | 318 | 318 | 310 | 310 | 288 |

COMPARATIVE EXAMPLE I

A series of blends was prepared from the polyphenylene sulfide used in EXAMPLE 2 and a commercial nylon 66 identified as Celanese 1000-1. The blends were prepared as in EXAMPLE 2 except that the extruder setting temperature was 288° C. instead of 299° C. in zones 4–8.

Test bars were prepared from the blends and from the neat resins, processed in the ZSK-30 extruder in like manner, and tested as in EXAMPLE 2, results and molding conditions being shown in TABLE 7.

Pressure in the jacketed tube was about 7.0 kg/cm$_2$ (100 psig), temperature of the circulating heat exchange fluid was about 335°–345° C. and extruder barrel temperature was 310°–320° C. Polyphthalamide 0 then was blended with varying amounts of polyphenylene sulfide of the type used in EXAMPLE 2 following essentially the procedure of that example and the blends and neat resins were tested. Results and molding conditions were as follows:

TABLE 7

|  | J | K | L | M | N | D | H |
|---|---|---|---|---|---|---|---|
| Nylon/Polyphenylene Sulfide (wt. %) | 100/0 | 90/10 | 85/15 | 50/50 | 10/90 | 0/100 | 0/100 |
| UTS (kg/cm$^2$) | 817 | 874 | 817 | 584 | 326 | 368 | 390 |
| Elongation at Break (%) | 18.2 | 4.2 | 3.7 | 2.2 | 1.1 | 1.2 | 1.6 |
| Flexural Modulus ($\times 10^3$ kg/cm$^2$) | 34.0 | 35.2 | 35.4 | 39.1 | 43.1 | 43.7 | 41.5 |
| Notched Izod (cm-kg/cm) | 5.5 | 4.4 | 4.9 | 3.3 | 2.7 | 2.7 | 1.9 |
| Tensile Impact (cm-kg/cm$^2$) | 127 | 108 | 101 | 43 | 20 | 21 | 26 |
| LOI (%) | 25 | 25 | 26 | 33 | 37 | 38 | ND |
| Tg (°C.) | 38 | 39 | 40 | 38 | 41 |  |  |
|  |  | 83 | 84 | 81 | 85 | 85 | 85 |
| Tm (°C.) | 261 | 260 | 260 | 258 | 252 |  |  |
|  |  |  |  | 279 | 279 | 279 | 271 |
| HDT @ 264 psi (°C.) | 189 | 201 | 200 | 210 | 97 | 97 | 102 |
| Water Absorption (wt. % after 24 hours) | 1.27 | 1.23 | 1.16 | 0.70 | 0.12 | 0.03 | ND |
| Retained UTS (% after 24 hrs in boiling MeOH) | 42 | 30 | 32 | 50 | 77 | 68* | ND |
| Mold Temperature (°C.) | 93 | 93 | 93 | 93 | 93 | 93 | 93 |
| Barrel Temperature |  |  |  |  |  |  |  |
| Rear Zone (°C.) | 277 | 277 | 277 | 277 | 277 | 277 | 293 |
| Front Zone (°C.) | 282 | 282 | 282 | 282 | 282 | 282 | 304 |
| Nozzle (°C.) | 282 | 282 | 282 | 282 | 282 | 282 | 304 |

*This value is an average of five widely divergent test values. Retesting gave 98% as noted in TABLE 4.

EXAMPLES 23–25

Following essentially the procedure of EXAMPLE 1, a polyphthalamide having a melting point of 297° C., melt crystallization temperature of 245° C. and inherent viscosity of about 1.02 dl/g (hereinafter Polyphthalamide "O",) was prepared from terephthalic acid, isophthalic acid, adipic acid and hexamethylene diamine in a mole ratio of 60:15:25:100.

TABLE 8

| | Example | | | | |
|---|---|---|---|---|---|
| | O | 23 | 24 | 25 | D |
| Polyphthalamide/ Polyphenylene Sulfide (wt %) | 100/0 | 90/10 | 50/50 | 10/90 | 0/100 |
| UTS (kg/cm$^2$) | 937 | 944 | 387 | 345 | 373 |
| Elongation at Break (%) | 6.9* | 4.0 | 1.4 | 1.1 | 1.2 |
| Flexural Modulus (× 10$^3$ kg/cm$^2$) | 34.6 | 35.9 | 36.5 | 38.6 | 40.4 |
| Notched Izod (cm-kg/cm) | 3.8 | 4.4 | 1.1 | 1.1 | 1.1 |
| Flexural Strength (kg/cm$^2$) | 1191 | 1479 | 874 | 803 | 867 |
| Tg (°C.)** | 104 | 101 | 99 | 87 | 88 |
| Tm (°C.) | 307 | 307 | 305 | 305 | |
| | | 278 | 279 | 278 | 276 |
| HDT @ 264 psi (°C.) | 107 | 105 | 106 | 92 | 100 |
| Degradation Temp. (°C.) | 372 | 372 | 391 | 382 | 427 |
| Mold Temperature (°C.) | 93 | 93 | 93 | 93 | 93 |
| Barrel Temperature (°C.) | | | | | |
| Rear Zone | 310 | 293 | 293 | 293 | 277 |
| Front Zone | 316 | 304 | 304 | 304 | 282 |
| Nozzle | 316 | 304 | 304 | 304 | 282 |

*This is an average of six diverging measurements (7.4%, 9.6%, 10.6%, 3.8%, 3.3% and 6.3%). Reasons for such divergence are unknown.
**Second Tgs for these specimens were not observed.

Solvent resistance of the blends from these examples were determined by measuring UTS of test bars before and after immersion in boiling (65° C.) methanol for 24 hours and in acetic acid at 93° C. for 24 hours and calculating retained UTS as a percentage of UTS before immersion. Solvent exposures were performed according to ASTM D-543. Results are shown in TABLE 9.

TABLE 9

| | Example | | | | |
|---|---|---|---|---|---|
| | O | 23 | 24 | 25 | D |
| Polyphthalamide/ Polyphenylene Sulfide (wt %) | 100/0 | 90/10 | 50/50 | 10/90 | 0/100 |
| UTS (kg/cm$^2$) | 1106 | 902 | 317 | 366 | 416 |
| UTS (kg/cm$^2$) after 24 hours in: | | | | | |
| 65° C. Methanol | 672 | 591 | 334 | 244 | 361 |
| 93° C. Acetic Acid | 451 | 381 | 331 | 365 | 404 |
| Retained UTS (%) after 24 hours in: | | | | | |
| 65° C. Methanol | 61 | 66 | 105 | 67 | 87 |
| 93° C. Acetic Acid | 41 | 42 | 104 | 100 | 97 |

COMPARATIVE EXAMPLE II

For purposes of comparison, a polyphthalamide of 50:50:100 terephthalic acid, isophthalic acid and hexamethylene diamine, corresponding to the description of the amorphous polyamide, Zytel 330, given in U.S. Pat. No. 4,258,335, was prepared following essentially the procedure of EXAMPLE 1 and then blended with polyphenylene sulfide following essentially the procedure of EXAMPLE 2. The blends were tested; results and molding conditions are reported in TABLE 10 in which the polyphthalamide is designated "P". Heat deflection temperature at 264 psi, according to ASTM D-648, of Polyphthalamide P compounded with 33 weight percent glass fibers as in Examples 5-7 and molded using a mold heated at 104° C. was 133° C.

TABLE 10

| | Example | | | | |
|---|---|---|---|---|---|
| | P | Q | R | S | D |
| Polyphthalamide/ Polyphenylene Sulfide (wt %) | 100/0 | 90/10 | 50/50 | 10/90 | 0/100 |
| UTS (kg/cm$^2$) | 834 | 852 | 387 | 303 | 324 |
| Elongation at Break (%) | 9.2* | 4.9 | 1.6 | 1.0 | 1.1 |
| Flexural Modulus (× 10$^3$ kg/cm$^2$) | 31.1 | 30.2 | 33.7 | 39.2 | 40.4 |
| Notched Izod (cm-kg/cm) | 8.2 | 6.5 | 1.1 | 1.1 | 1.1 |
| Flexural Strength (kg/cm$^2$) | NB** | NB** | 831 | 768 | 852 |
| Tg (°C.) | 125 | 130 | 86 | 93 | 91 |
| Tm (°C.) | 261 | 273 | 279 | 280 | 279 |
| HDT @ 264 psi (°C.) | 118 | 114 | 112 | 103 | 99 |
| Degradation Temp. (°C.) | 396 | 384 | 404 | 410 | 418 |
| Mold Temperature (°C.) | 93 | 93 | 93 | 93 | 93 |
| Barrel Temperature (°C.) | | | | | |
| Rear Zone | 277 | 277 | 277 | 277 | 277 |
| Front Zone | 282 | 282 | 282 | 282 | 282 |
| Nozzle | 282 | 282 | 282 | 282 | 282 |

*This is an average of six diverging measurements (3.3%, 6.7%, 6.5%, 6.5%, 10.3% and 22.0%); reasons for the divergence are unknown.
**Test specimens did not break or yield below 5% strain.

Comparing results in TABLE 10 with those reported in TABLES 1, 3-6 and 8 with respect to blends according to the invention it can be seen that there was generally a greater decline in mechanical properties, such as UTS and Notched Izod, of the comparative blends with increasing levels of polyphenylene sulfide than shown by the invented blends.

COMPARATIVE EXAMPLE III

For purposes of comparison, blends of polyphenylene sulfide of the type used in EXAMPLE 2 with a commercial polyphthalamide designated Zytel® 330 available from E. I. DuPont de Nemours Co. were prepared following essentially the procedure of EXAMPLE 2. Zytel 330 is believed to be an amorphous polyamide of 30:70 terephthalic acid and isophthalic acid with hexamethylene diamine plus a small amount of bis-p-aminocyclohexyl(methane). The blends were tested; results and molding conditions are reported in TABLE 11 in which the Zytel 330 is identified as "T." Heat deflection temperature at 264 psi according to ASTM D-648 of the Zytel 330 compounded with 33 weight percent glass fibers as in EXAMPLES 5-7 and molded using a mold heated at 104° C. was 129° C.

TABLE 11

| | Example | | | | |
|---|---|---|---|---|---|
| | T | U | V | W | D |
| Polyphthalamide/ Polyphenylene Sulfide (wt %) | 100/0 | 90/10 | 50/50 | 10/90 | 0/100 |
| UTS (kg/cm$^2$) | 838 | 810 | 606 | 331 | 359 |

TABLE 11-continued

| | Example | | | | |
|---|---|---|---|---|---|
| | T | U | V | W | D |
| Elongation at Break (%) | 4.3 | 4.0 | 2.5 | 1.1 | 1.1 |
| Flexural Modulus ($\times 10^3$ kg/cm$^2$) | 30.8 | 30.3 | 33.4 | 37.9 | 39.8 |
| Notched Izod (cm-kg/cm) | 4.9 | 4.4 | 2.2 | 0.5 | 0.5 |
| Flexural Strength (kg/cm$^2$) | 1339 | 1303 | 1240 | 705 | 852 |
| Tg (°C.) | 130 | 131 | 87 | 89 | 88 |
| Tm (°C.) | * | 278 | 279 | 277 | 277 |
| HDT @ 264 psi (°C.) | 116 | 113 | 113 | 105 | 104 |
| Degradation Temp. (°C.) | 379 | 395 | 398 | 403 | 427 |
| Mold Temperature (°C.) | 93 | 93 | 93 | 93 | 93 |
| Barrel Temperature (°C.) | | | | | |
| Rear Zone | 277 | 277 | 277 | 277 | 277 |
| Front Zone | 282 | 282 | 282 | 282 | 282 |
| Nozzle | 282 | 282 | 282 | 282 | 282 |

*Polyphthalamide T lacked a definite melting point, indicating the substantially amorphous nature thereof.

Solvent resistance of these blends was determined as in EXAMPLES 23–25; results are reported in TABLE 12.

TABLE 12

| | Example | | | | |
|---|---|---|---|---|---|
| | T | U | V | W | D |
| Polyphthalamide/ Polyphenylene Sulfide (wt %) | 100/0 | 90/10 | 50/50 | 10/90 | 0/100 |
| UTS (kg/cm$^2$) | 930 | 733 | 585 | 345 | 416 |
| UTS (kg/cm$^2$) after 24 hours in: | | | | | |
| 65° C. Methanol | * | * | * | 217 | 361 |
| 93° C. Acetic Acid | * | * | * | 279 | 404 |
| Retained UTS (%) after 24 hours in: | | | | | |
| 65° C. Methanol | * | * | * | 63 | 87 |
| 93° C. Acetic Acid | * | * | * | 81 | 97 |

*Specimens disintegrated and could not be tested.

Comparing the results in TABLES 11 and 12 with those in TABLES 1, 3–6, 8 and 9, it can be seen that the comparative, amorphous polyphthalamide component-containing blends and the invented blends, while generally comparable in mechanical properties, were considerably different in retention of ultimate tensile strength after exposure to methanol and acetic acid, the invented blends showing far superior property retention.

EXAMPLES 26–28

EXAMPLES 23–25 were repeated except that a different ZSK-30 extruder was used. Results and molding conditions are reported in TABLE 13.

TABLE 13

| | Example | | | | |
|---|---|---|---|---|---|
| | O | 26 | 27 | 28 | D |
| Polyphthalamide/ Polyphenylene Sulfide (wt %) | 100/0 | 90/10 | 50/50 | 10/90 | 0/100 |
| UTS (kg/cm$^2$) | 993 | 909 | 395 | 359 | 324 |
| Elongation at Break (%) | 4.4 | 3.8 | 1.4 | 1.2 | 1.1 |
| Flexural Modulus ($\times 10^3$ kg/cm$^2$) | 35.6 | 36.5 | 37.1 | 39.2 | 40.4 |
| Notched Izod (cm-kg/cm) | 3.8 | 2.7 | 1.1 | 1.1 | 1.1 |
| Flexural Strength (kg/cm$^2$) | 1479 | 1515 | 852 | 845 | 852 |
| Tg (°C.) | 104 | 102 | 105 86 | 88 | 91 |
| Tm (°C.) | 308 | 308 | 305 278 | 275 | 279 |
| HDT @ 264 psi (°C.) | 104 | 115 | 109 | 103 | 99 |
| Degradation Temp. (°C.) | 386 | 380 | 391 | 375 | 418 |
| Mold Temperature (°C.) | 93 | 93 | 93 | 93 | 93 |
| Barrel Temperature (°C.) | | | | | |
| Rear Zone | 310 | 293 | 293 | 293 | 277 |
| Front Zone | 316 | 304 | 304 | 304 | 282 |
| Nozzle | 316 | 304 | 304 | 304 | 282 |

EXAMPLES 29–31

The blends prepared in EXAMPLES 23–25 and neat resins of the type used in those examples were dry blended with 33 weight percent glass fibers and the filled blends were molded and tested following essentially the procedure of EXAMPLES 26–28; results and molding conditions are shown in TABLE 14.

TABLE 14

| | Example | | | | |
|---|---|---|---|---|---|
| Blend or Neat Resin | X | 29 | 30 | 31 | Y |
| From Example | O | 23 | 24 | 25 | D |
| Polyphthalamide/ Polyphenylene Sulfide (wt %) | 100/0 | 90/10 | 50/50 | 10/90 | 0/100 |
| UTS (kg/cm$^2$) | 1804 | 2078 | 1261 | 1233 | 1423 |
| Elongation at Break (%) | 3.6 | 4.1 | 2.2 | 2.2 | 2.7 |
| Flexural Modulus ($\times 10^3$ kg/cm$^2$) | 100 | 102 | 106 | 116 | 118 |
| Flexural Strength (kg/cm$^2$) | 2755 | 2832 | 1853 | 2029 | 2071 |
| Notched Izod (cm-kg/cm) | 14.2 | 14.2 | 15.8 | 14.7 | 10.4 |
| HDT @ 264 psi (°C.) | 289 | 288 | 273 | 269 | 267 |
| Mold Temperature (°C.) | 104 | 104 | 104 | 104 | 104 |
| Barrel Temperature (°C.) | | | | | |
| Rear Zone | 310 | 293 | 293 | 293 | 277 |
| Front Zone | 316 | 304 | 304 | 304 | 282 |
| Nozzle | 316 | 304 | 304 | 304 | 282 |

COMPARATIVE EXAMPLE IV

The procedure of EXAMPLES 29–31 was repeated using the blends and neat resins of COMPARATIVE EXAMPLE II; results and molding conditions are shown in TABLE 15.

TABLE 15

| Example<br>Blend or Neat Resin From Example: | Z<br>P | AA<br>Q | BB<br>R | CC<br>S | DD<br>D |
|---|---|---|---|---|---|
| Polyphthalamide/Polyphenylene Sulfide (wt %) | 100/0 | 90/10 | 50/50 | 10/90 | 0/100 |
| UTS (kg/cm$^2$) | 2106 | 2092 | 1324 | 1282 | 1381 |
| Elongation at Break (%) | 4.3 | 4.3 | 2.4 | 2.3 | 2.5 |
| Flexural Modulus ($\times 10^3$ kg/cm$^2$) | 91.3 | 94.1 | 101 | 110 | 112 |
| Flexural Strength (kg/cm$^2$) | 2733 | 2846 | 1909 | 1902 | 2015 |
| Notched Izod (cm-kg/cm) | 13.1 | 13.6 | 16.9 | 18.0 | 13.1 |
| HDT @ 264 psi (°C.) | 133 | 132 | 250 | 269 | 269 |
| Mold Temperature (°C.) | 104 | 104 | 104 | 104 | 104 |
| Barrel Temperature (°C.) | | | | | |
| Rear Zone | 282 | 282 | 282 | 282 | 282 |
| Front Zone | 288 | 288 | 288 | 288 | 288 |
| Nozzle | 288 | 288 | 288 | 288 | 288 |

COMPARATIVE EXAMPLE V

The procedure of EXAMPLES 29–31 was repeated using the blends and neat resins of COMPARATIVE EXAMPLE III; results and molding conditions are shown in TABLE 16.

TABLE 16

| Example<br>Blend or Neat Resin From Example: | EE<br>T | FF<br>U | GG<br>V | HH<br>W | II<br>D |
|---|---|---|---|---|---|
| Polyphthalamide/Polyphenylene Sulfide (wt %) | 100/0 | 90/10 | 50/50 | 10/90 | 0/100 |
| UTS (kg/cm$^2$) | 1980 | 2106 | 1613 | 1324 | 1423 |
| Elongation at Break (%) | 3.9 | 4.3 | 3.1 | 2.4 | 2.7 |
| Flexural Modulus ($\times 10^3$ kg/cm$^2$) | 101 | 105 | 110 | 111 | 111 |
| Flexural Strength (kg/cm$^2$) | 2931 | 3058 | 2177 | 2071 | 2071 |
| Notched Izod (cm-kg/cm) | 13.1 | 12.5 | 11.4 | 12.0 | 10.4 |
| HDT @ 264 psi (°C.) | 129 | 130 | 142 | 267 | 267 |
| Mold Temperature (°C.) | 104 | 104 | 104 | 104 | 104 |
| Barrel Temperature (°C.) | | | | | |
| Rear Zone | 277 | 277 | 277 | 277 | 277 |
| Front Zone | 282 | 282 | 282 | 282 | 282 |
| Nozzle | 282 | 282 | 282 | 282 | 282 |

EXAMPLES 32–34

The procedure of EXAMPLES 29–31 was repeated using the blends and neat resins of EXAMPLES 26–28; results and molding conditions are shown in TABLE 17.

TABLE 17

| Example<br>Blend or Neat Resin From Example: | JJ<br>O | 32<br>26 | 33<br>27 | 34<br>28 | KK<br>D |
|---|---|---|---|---|---|
| Polyphthalamide/Polyphenylene Sulfide (wt %) | 100/0 | 90/10 | 50/50 | 10/90 | 0/100 |
| UTS (kg/cm$^2$) | 1733 | 2015 | 1219 | 1381 | 1381 |
| Elongation at Break (%) | 3.3 | 3.9 | 2.2 | 2.4 | 2.5 |
| Flexural Modulus ($\times 10^3$ kg/cm$^2$) | 92.8 | 98.1 | 107 | 112 | 112 |
| Flexural Strength (kg/cm$^2$) | 2684 | 2895 | 1994 | 2163 | 2015 |
| Notched Izod (cm-kg/cm) | 14.7 | 14.7 | 17.4 | 13.6 | 13.1 |
| HDT @ 264 psi (°C.) | 291 | 289 | 272 | 266 | 269 |
| Mold Temperature (°C.) | 104 | 104 | 104 | 104 | 104 |
| Barrel Temperature (°C.) | | | | | |
| Rear Zone | 310 | 293 | 293 | 293 | 277 |

TABLE 17-continued

| Example | JJ | 32 | 33 | 34 | KK |
|---|---|---|---|---|---|
| Blend or Neat Resin From Example: | 0 | 26 | 27 | 28 | D |
| Front Zone | 316 | 304 | 304 | 304 | 282 |
| Nozzle | 316 | 304 | 304 | 304 | 282 |

EXAMPLE 35

This example demonstrates improved thermal endurance of the invented blends relative to the neat polyphthalamide component thereof. The polyphthalamide used in this example as a control and to prepare a blend with ten weight percent Ryton P6 polyphenylene sulfide was prepared essentially as in EXAMPLE 1 from terephthalic acid, isophthalic acid and adipic acid, in a mole ratio of 65:25:10 and hexamethylene diamine. Elemental analysis of the polyphenylene sulfide showed 23.6 weight percent sulfur. The polyphthalamide had the following ash and elemental analyses for sulfur and copper: Ash content (%) 34.8; S content (ppm) <10; Cu content ppm 380

A 33 weight percent glass fiber-filled blend of 90 weight percent polyphthalamide and ten weight percent polyphenylene sulfide was prepared in two steps by extrusion compounding. In a first step, 2700 grams of the polyphthalamide, in the form of pellets, were blended with 300 grams of the polyphenylene sulfide, 13.5 grams talc, 16.1 grams potassium iodide, and 415 grams cupric acetate by tumbling. The blended mixture was rear fed to a ZSK-30 twin screw extruder at a rate of 10.3 kg/hr. The extruder had six independently controlled temperature zones. The temperature set points and actual zone temperatures, beginning at Zone 1 (the feed port) and ending at Zone 6 (the die) were as follows:

| | Zone Temperature (°C.) | | | | | |
|---|---|---|---|---|---|---|
| | 1 | 2 | 3 | 4 | 5 | 6 |
| Set | 149 | 310 | 310 | 299 | 299 | 310 |
| Actual | 192 | 276 | 300 | 299 | 299 | 293 |

The recorded melt temperature was 307° C., screw torque was 55% and die pressure was 16.9 kg/cm$^2$. Screw speed was 100 rpm. The extruded strand was tan in color.

The strand was cut into pellets by a mechanical chopper. Pellet bulk density was 0.72 g/cm$^3$.

In a second step the blend was compounded with 33 weight percent glass fibers, identified as PPG 3540 obtained from PPG Industries, Inc., which were added to the melted blend through an open port in the third heating zone of the ZSK-30 twin screw extruder. The temperature profile for this extrusion was:

| | Zone Temperature (°C.) | | | | | |
|---|---|---|---|---|---|---|
| | 1 | 2 | 3 | 4 | 5 | 6 |
| Set | 288 | 321 | 327 | 324 | 324 | 319 |
| Actual | 274 | 310 | 307 | 318 | 324 | 316 |

Screw rpm was 100, torque was 65%, die pressure was 21.8 kg/cm$^2$ and melt temperature was 330° C. The tan, extruded strand was chopped into pellets with a bulk density of 0.35 g/cm$^3$. Ashing and elemental analysis of the resulting filled blend gave the following results: Ash content (%) 32.9; S content (%) 1.63; Cu content (ppm) 370

The resin was molded into Type IV tensile specimens in an Arburg, Model 221 E injection molding machine. The initial tensile strength was 2200 kg/cm$^2$. The tensile specimens were thermally aged in groups of five at 220° C. for up to 1008 hours. The tensile strength of each group after aging was determined. These results, together with results for test bars prepared and aged in like manner from the glass fiber filled polyphthalamide without polyphenylene sulfide, are shown below.

| | % Retained Tensile Strength | |
|---|---|---|
| Time (hours) | EXAMPLE 35 (90/10 Polyphthalamide Polyphenylene Sulfide) | Control (Polyphthalamide) |
| 0 | 100 | 100 |
| 168 | 87.2 | 76.3 |
| 336 | 66.1 | 64.8 |
| 504 | 61.3 | 56.6 |
| 672 | 55.9 | 53.8 |
| 720 | 57.5 | — |
| 744 | 57.8 | 52.1 |
| 840 | 50.2 | 47.3 |
| 1008 | 43.1 | 43.1 |

From these thermal aging results the time to 50% retention of tensile strength (hereinafter "F-50") was interpolated, using both cubic polynomial and exponential fits of the data, as follows:

| | Cubic | | Exponential | |
|---|---|---|---|---|
| | F-50 (hours) | r | F-50 (hours) | r |
| EXAMPLE 35 | 881 | .989 | 840 | .975 |
| Control | 810 | .998 | 768 | .974 | where r is the correlation coefficient. Both treatments of the data demonstrate that the resin containing the polyphenylene sulfide had about a 10% longer F-50 at 220° C.

EXAMPLE 36

A second 90/10 polyphthalamide/polyphenylene sulfide blend was prepared using the same procedures and materials as described above, except that the polyphenylene sulfide used was Ryton P4, which had been advanced in molecular weight by solid state polymerization for 16 hours at 238° C. Compounding conditions for the first pass through the extruder were as follows:

|  | Zone Temperature (°C.) | | | | | |
| --- | --- | --- | --- | --- | --- | --- |
|  | 1 | 2 | 3 | 4 | 5 | 6 |
| Set | 149 | 310 | 310 | 299 | 299 | 310 |
| Actual | 184 | 288 | 299 | 299 | 299 | 305 |

Torque was 60%, die pressure was 12 kg/cm², screw rpm was 100, melt temperature was 314° C. and feed rate was 10.3 kg/hr. Pellet bulk density was 0.70 g/cm³. The pellets were tan in color.

The conditions for the second extrusion pass were as follows:

|  | Zone Temperature (°C.) | | | | | |
| --- | --- | --- | --- | --- | --- | --- |
|  | 1 | 2 | 3 | 4 | 5 | 6 |
| Set | 288 | 321 | 327 | 324 | 324 | 319 |
| Actual | 271 | 304 | 310 | 316 | 318 | 313 |

The melt temperature was 319° C., and the screw speed was 100 rpm.

Ash and elemental analysis of the blend the gave following results: Ash content (%) 35.8; S content (%) 1.74; Cu content (ppm) 330.

Type I tensile specimens of this sample were thermally aged at 220° C. for 120 hours with the blend from EXAMPLE 35 and the control used in the example. The initial and percent retained tensile strengths were as follows:

|  | Tensile Strength | |
| --- | --- | --- |
|  | Initial (kg/cm²) | Retained (%) |
| EXAMPLE 36 | 2140 | 86 |
| EXAMPLE 35 | 2070 | 89 |
| CONTROL | 2400 | 83 |

Examples 37–42

Blends comprising polyphenylene sulfide with other polyphthalamides were prepared, molded and tested. Polyphthalamide D, employed in Examples 37–39 and Control LL, is a hexamethylene terephthalamide/adipamide copolymer having a terephthalic acid/adipic acid ratio of 65/35. Polyphthalamide E, employed in Examples 40–42 and Control MM, is a copolymer of terephthalic acid with a mixture of hexamethylene diamine and its isomer, 2-methylpentamethylene diamine in a 1:1 weight ratio.

The polyphthalamides were prepared substantially following the process outlined in U.S. Pat. No. 4,831,108; the process is exemplified herein as Example 1. Blends comprising polyphthalamide and Ryton P-4 grade of polyphenylene sulfide at three levels together with 35 wt % (based on total composition) of glass fiber were compounded using a 40 mm twin-screw, corotating, vacuum-vented Werner-Pfleiderer ZSK extruder, using a vacuum of 27 in. Hg applied to the port at zone 7, by feeding the glass fiber gravimetrically to the port at zone 5 using a side-arm feeder. The actual temperatures in the extruder barrel ranged from 280° to 370° C. and a die temperature of 345° C., giving a melt temperature of 359°–365° C. Throughput rates were generally 100–200 lbs/hr, the lower rates being employed for the blends with higher levels of polyphenylene sulfide. Test specimens were injection molded using a 75 ton New Britain injection molding machine. The melt temperatures (actual) were in the range 328°–335° C. and the mold temperatures (actual) were in the range 148°–165° C.

The polyphenylene sulfide control specimen NN was prepared by compounding a commercially-obtained PPS resin containing 40 wt % fiberglass with neat resin from the same source, substantially following the procedures outlined above, to provide compositions and test specimens having 35 wt % glass fiber.

It was observed during the injection molding of the various glass-filled blends that the injection pressures decreased as the proportion of PPS resin in the blend increased. The injection pressure used for molding glass-filled PPA-D resin control specimens was 1760 psi, while for the 70/30 blend the injection pressure was 1250 psi, and for the 50/50 blend the injection pressure was 1185 psi. Similarly, the injection pressure used for molding glass-filled PPA-E resin control specimens was 1700 psi, while for the 70/30 blend the injection pressure was 1520 psi, and for the 50/50 blend the injection pressure was 1200 psi. The control specimens molded from the glass-filled PPS resin required injection pressures of 1260 psi.

The mechanical properties are summarized in Table 18 and Table 19.

TABLE 18

| Blend Example | LL | 37 | 38 | 39 | NN |
| --- | --- | --- | --- | --- | --- |
| PolyphthalamideD/Polyphenylene Sulfide (wt %) | 100/0 | 85/15 | 70/30 | 50/50 | 0/100 |
| UTS (kg/cm²) | 1901 | 1873 | 1830 | 1654 | 1267 |
| Elongation at Break (%) | 2.1 | 2.0 | 1.8 | 1.4 | 1.2 |
| Tensile Modulus (× 10³ kg/cm²) | 107 | 111 | 120 | 147 | 127 |
| Flexural Modulus (× 10³ kg/cm²) | 113 | 119 | 124 | 138 | 143 |
| Flexural Strength (kg/cm²) | 2781 | 2809 | 2471 | 2161 | 1654 |
| Izod (cm-kg/cm) notched | 8.2 | 8.4 | 8.5 | 6.9 | 7.7 |
| no-notch | 74.4 | 66.8 | 50.5 | 34.7 | 29.3 |
| HDT @ 264 psi (°C.) | 307 | 301 | 294 | 277 | 266 |

TABLE 19

| Blend Example | | MM | 40 | 41 | 42 | NN |
|---|---|---|---|---|---|---|
| PolyphthalamideE/Polyphenylene Sulfide (wt %) | | 100/0 | 85/15 | 70/30 | 50/50 | 0/100 |
| UTS (kg/cm$^2$) | | 2245 | 2154 | 1661 | 1535 | 1267 |
| Elongation at Break (%) | | 2.8 | 2.8 | 1.7 | 1.4 | 1.2 |
| Tensile Modulus ($\times 10^3$ kg/cm$^2$) | | 109 | 109 | 111 | 123 | 127 |
| Flexural Modulus ($\times 10^3$ kg/cm$^2$) | | 108 | 113 | 122 | 130 | 143 |
| Flexural Strength (kg/cm$^2$) | | 3029 | 2826 | 2031 | 1999 | 1654 |
| Izod (cm-kg/cm) | notched | 8.7 | 7.5 | 5.9 | 5.9 | 7.7 |
| | no-notch | 77.6 | 66.8 | 38.6 | 23.9 | 29.3 |
| HDT @ 264 psi (°C.) | | 266 | 258 | 262 | 262 | 266 |

The blends of Examples 37–42 and the corresponding controls were subjected to aging in antifreeze and in methanol/fuel mixtures to evaluate chemical resistance in these aggressive solvent mixtures. The antifreeze mixture was a 50/50 vol./vol. mixture of ethylene glycol and water. The methanol/fuel mixture was standard test mixture CM-85, a mixture of 50 ml of toluene, 850 ml of methanol and 0.85 ml of water, with 0.005 g sodium chloride and 0.050 ml formic acid per liter of solution. The specimens were immersed in the liquid mixtures and held at the specified test temperature (135° C. for the antifreeze mixture, 60° C. for the methanol/fuel mixture) for the test period. Specimens were withdrawn in groups of five at the pre-determined intervals and tested for tensile strength to demonstrate resistance (or lack of resistance) to the solvents. The data are reported in Tables 20–23.

TABLE 20

Resistance to CM-85 Solution at 60° C.

| Blend Example | LL | 37 | 38 | 39 | NN |
|---|---|---|---|---|---|
| PolyphthalamideD/Polyphenylene Sulfide (wt %) | 100/0 | 85/15 | 70/30 | 50/50 | 0/100 |
| Days exposure at 60°C. | retained (%) (UTS, kg/cm$^2$) | | | | |
| 0* | 100 (1901) | 100 (1872) | 100 (1830) | 100 (1654) | 100 (1267) |
| 2 | 72 | 77 | 79 | 92 | 101 |
| 5 | 59 | 64 | 66 | 86 | 99 |
| 8 | 61 | 65 | 65 | 84 | 102 |

Notes: *dry, as molded, test specimen

TABLE 21

Resistance to CM-85 Tolution at 60° C.

| Blend Example | MM | 40 | 41 | 42 | NN |
|---|---|---|---|---|---|
| PolyphthalamideE/Polyphenylene Sulfide (wt %) | 100/0 | 85/15 | 70/30 | 50/50 | 0/100 |
| Days exposure at 60° C. | retained (%) (UTS, kg/cm$^2$) | | | | |
| 0* | 100 (2246) | 100 (2154) | 100 (1683) | 100 (1534) | 100 (1267) |
| 2 | 85 | 86 | 87 | 99 | 101 |
| 5 | 76 | 78 | 81 | 97 | 99 |
| 8 | 70 | 72 | 76 | 96 | 102 |

Notes: *dry, as molded, test specimen

TABLE 22

| Resistance to Ethylene Glycol/water (50/50) Solution at 135° C. | | | | | |
|---|---|---|---|---|---|
| Blend Example | LL | 37 | 38 | 39 | NN |
| PolyphthalamideE/Polyphenylene Sulfide (wt %) | 100/0 | 85/15 | 70/30 | 50/50 | 0/100 |
| Days exposure at 60° C. | | retained (%) (UTS, kg/cm$^2$) | | | |
| 0* | 100 (1901) | 100 (1872) | 100 (1830) | 100 (1654) | 100 (1267) |
| 2 | 28 | 35 | 35 | 61 | 87 |
| 5 | 28 | 26 | 35 | 32 | 75 |
| 8 | 29 | 28 | 27 | 31 | 66 |

Notes: *dry, as molded, test specimen

TABLE 23

| Resistance to Ethylene Glycol/water (50/50) Solution at 135° C. | | | | | |
|---|---|---|---|---|---|
| Blend Example | MM | 40 | 41 | 42 | NN |
| PolyphthalamideE/Polyphenylene Sulfide (wt %) | 100/0 | 85/15 | 70/30 | 50/50 | 0/100 |
| Days exposure at 60° C. | | retained (%) (UTS, kg/cm$^2$) | | | |
| 0* | 100 (2246) | 100 (2154) | 100 (1683) | 100 (1534) | 100 (1267) |
| 2 | 58 | 78 | 77 | 89 | 87 |
| 5 | 42 | 58 | 51 | 69 | 75 |
| 8 | 35 | 47 | 36 | 49 | 66 |

Notes: *dry, as molded, test specimen

The melt rheology of the blends of Examples 37–42 and the corresponding controls was determined at 335° C., using a Kayeness Galaxy® capillary rheometer fitted with a die with an entrance angle of 120°, having a length of 0.80 in. and a diameter of 0.04 in. The rheology data are summarized in the following Table 24 and 25.

TABLE 24

| Melt Rheology at 335° C. | | | | | |
|---|---|---|---|---|---|
| Blend Example | LL | 37 | 38 | 39 | NN |
| PolyphthalamideD/Polyphenylene Sulfide (wt %) | 100/0 | 85/15 | 70/30 | 50/50 | 0/100 |
| Shear rate (sec$^{-1}$) | | | | | |
| 50 | 7750 | 7220 | 5000 | 4520 | 6990 |
| 100 | 4720 | 4260 | 3000 | 2740 | 4400 |
| 500 | 1770 | 1680 | 1380 | 1210 | 1920 |
| 1000 | 1100 | 1200 | 950 | 910 | 1390 |
| 2500 | 750 | 800 | 650 | 610 | 880 |
| 3500 | 820 | 730 | 590 | 550 | 750 |

Notes: Shear rates are apparent values; Melt viscosities are in poise.

TABLE 25

| Melt Rheology at 335° C. | | | | | |
|---|---|---|---|---|---|
| Blend Example | MM | 37 | 38 | 39 | NN |
| PolyphthalamideE/Polyphenylene Sulfide (wt %) | 100/0 | 85/15 | 70/30 | 50/50 | 0/100 |
| Shear rate (sec$^{-1}$) | | | | | |
| 50 | 7660 | 6650 | 4400 | 3810 | 6990 |
| 100 | 5710 | 4660 | 2980 | 2540 | 4400 |
| 500 | 3160 | 2450 | 1490 | 1080 | 1920 |

TABLE 25-continued

| Blend Example | Melt Rheology at 335° C. | | | | |
|---|---|---|---|---|---|
| | MM | 37 | 38 | 39 | NN |
| 1000 | 2360 | 1780 | 1110 | 830 | 1390 |
| 2500 | 1480 | 1160 | 760 | 560 | 880 |
| 3500 | 1150 | 940 | 660 | 500 | 750 |

Notes: Shear rates are apparent values; Melt viscosities are in poise.

It will be apparent from a comparison of the melt rheology of either of the two resin components with the rheology of each of the blends that the melt viscosity of the polyterephthalamide is reduced by adding the polyphenylene sulfide. This rheology behavior is consistent with the reduction in injection pressure observed for the blends, as noted herein above, and reflects a significant improvement in the processability for these blends over the corresponding glass-filled polyphthalamide.

When test specimens molded from the blends of Examples 37–42 are subjected to thermal aging substantially following the procedures in Example 35, the thermal endurance of the test specimens, as shown by comparing the retention of tensile properties for the blends with the polyphthalamide controls, will generally be seen to be improved by the addition of polyphenylene sulfide.

The invention will thus be seen to be a blend comprising a polyarylene sulfide and a polyterephthalamide wherein the polyterephthalamide component, when filled with glass fibers, has a heat deflection temperature at 264 psi, according to ASTM D-648, above about 240° C. The blends will preferably contain from about 10 to about 90 weight percent of the polyarylene sulfide component based on the weight of polyphthalamide and polyarylene sulfide and, when filled, will contain from about 10 to about 60 wt % of the filler. Generally, the polyphthalamide component may be characterized as comprising terephthalamide units, and may optionally include additional carboxylamide units, preferably selected from isophthalamide units and adipamide units. The proportion of terephthalamide units will lie in the range of from 40 to 100 mole % and, when present, from 0 to 35 mole % isophthalamide units and from 0–60 mole % adipamide units.

Further variations and modifications will be readily apparent to those skilled in the compounding arts, including the further incorporation of stabilizers, dyes, pigments, lubricants and processing aids and the like as commonly practiced in the resin arts, and these modifications will be understood as included within the scope of the invention set forth herein and in the appended claims.

We claim:

1. A composition comprising from about 10 to about 90 wt % of (i) a polyphthalamide comprising terephthalamide units, said polyphthalamide when filled with 33 weight percent glass fibers and molded having a heat deflection temperature at 264 psi according to ASTM D-648 of at least about 240° C.; and from about 90 to about 10 wt % of (ii) a polyphenylene sulfide based on the total weight of said components (i) and (ii).

2. The composition of claim 1 further comprising a filler.

3. A composition comprising from about 10 to about 90 wt % of a polyphthalamide having a heat deflection temperature at 264 psi according to ASTM D-648 of at least about 240° C. when filled with 33 weight percent glass fibers and molded, said polyphthalamide comprising the following recurring units:

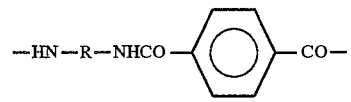 A

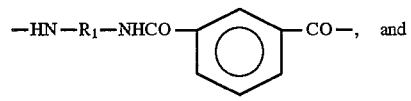 B

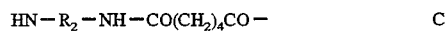 C wherein the mole ratio of units A, B and C is about 40–100:0–35:0–60 and wherein R, $R_1$ and $R_2$ are independently divalent hydrocarbyl radicals; and from about 90 to about 10 wt % of a polyphenylene sulfide, the proportion of each said component being based on combined weight of said polyphthalamide and said polyphenylene sulfide.

4. The composition of claim 3 wherein R, $R_1$ and $R_2$ comprise hexamethylene.

5. The composition of claim 3 wherein the polyphthalamide consists of units A and C.

6. The composition of claim 3 wherein the mole ratio of dicarboxylic acid moieties in the units A, B and C is about 65–90:25–0:35–5.

7. The composition of claim 3 further comprising from about 10 to about 60 weight percent glass fiber, based on total weight of the composition.

8. A composition comprising from about 10 to about 90 wt % of a polyphthalamide having a heat deflection temperature at 264 psi according to ASTM D-648 of at least about 240° C. when filled with 33 weight percent glass fibers and molded, said polyphthalamide comprising at least two different recurring units selected from the group consisting of the following recurring units:

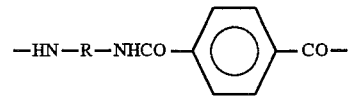 A

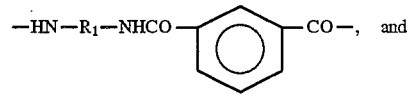 B

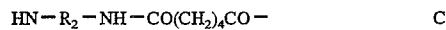 C wherein R, $R_1$ and $R_2$ are independently divalent hydrocarbyl radicals; and from about 90 to about 10 wt % of a polyphenylene sulfide, the proportion of each said component being based on combined weight of said polyphthalamide and said polyphenylene sulfide.

9. The composition of claim 8 wherein the mole ratio of units A, B and C is about 40–99:0–35:0–60.

10. The composition of claim 8 wherein the mole ratio of dicarboxylic acid moieties in the units A, B and C is about 50–95:25–0:35–5.

11. The composition of claim 8 wherein the mole ratio of dicarboxylic acid moieties in the units A, B and C is about 65–90:25–0:35–5.

12. The composition of claim 8 wherein the polyphthalamide consists of units A and C.

13. The composition of claim 8 wherein the mole ratio of dicarboxylic acid moieties in the units A, B and C is about 50–90:0:50–10.

* * * * *

UNITED STATES PATENT AND TRADEMARK OFFICE
CERTIFICATE OF CORRECTION

PATENT NO.: 5,635,558

DATED: June 3, 1997

INVENTOR(S): Yu-Tsai Chen, David P. Sinclair

It is certified that error appears in the above-identified patent and that said Letters Patent is hereby corrected as shown below:

Patent reads:

| Col. | Line | | |
|---|---|---|---|
| 1 | 30 | "polyphthatamides" should read --polyphthalamides-- | |
| 5 | 34 | "R, R1, and R2" should read --R, $R_1$ and $R_2$-- | |
| 8 | 36 | "according to ASTM D-648g of" should read --according to ASTM D-648 of-- | |
| 9 | 10 | "untilled" should read --unfilled-- | |
| 31 | 52 | (Table 21) reads "Resistance to CM-85 Tolution" should read --Resistance to CM-85 Solution-- | |
| 33 | 6 | (Table 22) reads "PolyphthalamideE/" should read --PolyphthalamideD/-- | |

Signed and Sealed this

Second Day of February, 1999

Attest:

Attesting Officer

Acting Commissioner of Patents and Trademarks